Patented July 27, 1954

2,684,958

UNITED STATES PATENT OFFICE 2,684,958

DISPERSION PROCESS FOR CARBON BLACK

Addison W. Hubbard, Elizabeth, and Max W. Hill and Robert L. Zapp, Somerville, N. J., assignors to Standard Oil Development Company, a corporation of Delaware No Drawing. Application September 12, 1951,
Serial No. 246,342

7 Claims. (Cl. 260—41.5)

This invention relates to an improved process for compounding rubber and rubbery polymers and copolymers and, more particularly relates to a novel method for obtaining an efficient dispersion of pigments and, particularly, carbon black in rubber compositions.

It has long been a problem in commercial operations to find a way to obtain efficient dispersions of carbon black in the preparation and compounding of finished rubber and rubbery polymer products. The carbon black pigment is normally directly mixed with the rubbery material and, for best results, should be as finely and widely dispersed as possible. The two can be combined on a mill, if desired. The tendency, however, during mixing operations is for the pigment to flocculate and agglomerate in the rubber, thereby producing large clumps of pigment. As a result of such incomplete dispersion, the processing properties of the unvulcanized stocks are poor and the physical properties of the final rubber vulcanizates are impaired. These inferior properties are the result of incomplete utilization of the total surface area of the pigment particles present and result in a greatly reduced reinforcing action of the pigment upon the rubber. Other improvements proposed prior to this time have been found to possess disadvantages. The proposed soutions to the problem include complicated and drastic mixing procedures prolonged over a long period of time. Thus, it is not believed that a completely satisfactory solution has, up to the present time, been available as an answer to this very important compounding problem.

It has now been discovered that certain $P_2S_5$-treated materials and derivatives of these compounds are very efficient as dispersing aids for carbon black, both in natural rubber and in synthetic, rubbery polymers and copolymers. The superior results obtained can be readily shown by comparative studies of photographs of the compounded rubber taken through a light microscope and by a comparison of properties of the finished vulcanizates. In this way, a first-hand picture of the actual pigment distribution in the rubber, as well as the practical effects thereof, can be obtained. The advantages in dispersion obtained as a result of the dispersing aids are also evident by standardized turbidity and sedimentation tests carried out on solutions of the compounded rubbery material.

Certain other tests have also been utilized to indicate the more practical aspects of the improvements given by the invention. The effect upon the properties of the vulcanizates is an important factor in determining the actual value gained by means of the better dispersions accomplished. One such test is the comparative breaking stress determination. Another such test is the tear strength of the vulcanizates. Both of these tests show properties of carbon black compounded vulcanizates which are directly related to the degree of dispersion of the pigment.

The invention broadly covers the use of $P_2S_5$-treated hydrocarbon material. The hydrocarbon material may be treated with $P_2S_5$ and used directly or the treated materials may be further reacted to obtain the guanidine salts, the guanidine derivative salts, as well as the various aliphatic and aromatic amine salts, and the multivalent metal salts. All these products show the surprising property of improving the carbon black pigment dispersion in rubber and rubbery products.

It has been found, in accordance with the present invention, that if the reaction product of a phosphorus sulfide with an essentially hydrocarbon product is neutralized with guanidine or any of its derivatives as hereinafter defined or with any other compound containing a guanyl radical, the product so formed serves the purpose of acting as a good dispersing agent for carbon black in rubbery materials.

Guanidine and guanidine derivatives may be employed as the basic reagents for neutralizing the phosphorus sulfide-hydrocarbon reaction product. The free base guanidine and its derivatives may be used as well as basic acting salts of such bases as, for example, the carbonates of guanidine and its derivatives. Alternatively, the final products may be formed by double decomposition of a salt of guanidine or guanidine derivative, e. g., guanidine hydrochloride or sulfate, with a metal salt of the phosphorus sulfide-hydrocarbon reaction product. Substituted guanidines may be used. Broadly, the guanidine type basic compounds which may be reacted in accordance with the present invention may be defined by the formula

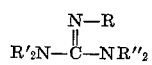

in which R, R', and R'' represent hydrogen or hydrocarbon groups containing 1 to 20 carbon atoms, e. g., including both straight chain alkyl groups, such as methyl, ethyl, propyl, butyl, and branched chain alkyl groups, such as octyl, isooctyl, 2-ethylhexyl, decyl, etc. radicals. R, R' and R'' may also represent cycloalkyl, arylalkyl, aryl or alkylaryl groups. In the case of a substituted guanidine it is most preferable to employ symmetrically trisubstituted compounds, and alkyl and cycloalkyl groups are the more preferred types of substituting groups. These include the symmetrical trialkyl, trinaphthenyl, and triarylalkyl guanidines.

The sulfide of phosphorus which is employed in the reaction with hydrocarbon material may be $P_2S_3$, $P_2S_5$, $P_4S_3$, $P_4S_7$ or other phosphorus sulfide, and is preferably phosphorus pentasulfide, $P_2S_5$.

The hydrocarbon material which may be reacted with a phosphorus sulfide in the first step of the production of these dispersing agents may be paraffins, olefins or olefin polymers, diolefins, acetylenes, aromatics or alkyl aromatics, cyclic aliphatics, petroleum fractions, such as lubricating oil fractions, petrolatums, waxes, cracked cycle stocks, or condensation products of petroleum fractions, solvent extracts of petroleum fractions, etc.

Essentially paraffinic hydrocarbons such as bright stock residuums, lubricating oil distillates, petrolatums or paraffin waxes may be employed.

An important class of suitable olefinic materials are the monoolefin polymers, in which the molecular weight ranges from about 200 to 20,000, preferably from about 600 to about 1200. These polymers may be obtained by the polymerization of low molecular weight monoolefinic hydrocarbons, such as ethylene, propylene, butylene, isobutylene, normal and isoamylenes, or hexenes, or by the copolymerization of any combination of the above monoolefinic materials.

Dispersion of channel black, furnace black and all types of carbon black conventionally used in rubbery compositions, can be improved by this process. The only limit is that the particle size of the carbon must be sufficiently small to permit its mixing with the rubber and improving its properties.

Some of the dispersion aids have been found to function more effectively than others but, of the types enumerated, all those tested have exhibited substantial activity as dispersion aids. Specific materials which may be employed include the guanidine salt of $P_2S_5$-treated low molecular weight polyisobutylene, diorthotolyl guanidine salt of $P_2S_5$-treated low molecular weight polyisobutylene, the triphenyl guanidine salt of $P_2S_5$-treated low molecular weight polyisobutylene, $P_2S_5$-treated polyisobutylene, the guanidine salt of $P_2S_5$-treated hydrocarbon oil (bright stock), and heavy multi-valent salts such as the aluminum, barium, tin, antimony, molybdenum, iron, cobalt, and nickel salts. A more complete description of these materials may be found in the disclosure of patent application, Serial No. 89,370, filed April 23, 1949, now U. S. Patent No. 2,613,205.

These dispersing aids may broadly be used in concentrations of from 3.0 to 10 parts by weight based on the amount of rubbery materials being compounded. About 5 parts by weight is preferred for optimum concentration of the guanidine salts.

The types of rubbery materials which show improved characteristics as a result of the use of these dispersion aids include natural rubber, the copolymers of iso-olefins with multi-olefins, specifically isobutylene copolymerized with conjugated diolefins, e. g., 97% isobutylene with 3% isoprene, the copolymers of diolefins and monoolefins as, for instance, 75% butadiene copolymerized with 25% styrene or the methyl styrenes, or acrylonitrile, polybutadiene, neoprene, and the neoprene copolymer of chloroprene and butadiene.

The phosphorus sulfide-hydrocarbon reaction product may be readily obtained by reacting the phosphorus sulfide with the hydrocarbon material at a temperature of about 200° F. to about 600° F., and preferably from about 300° F. to about 550° F., using from about 1 to about 10, preferably about 2 to about 5, molecular proportions of hydrocarbon to 1 molecular proportion of the sulfide of phosphorus in the reaction. It is advantageous to maintain a non-oxidizing atmosphere, such as an atmosphere of nitrogen, above the reaction mixture. Usually it is desirable to use an amount of the phosphorus sulfide that will completely react with the hydrocarbon so that no further purification becomes necessary. In the case of monoolefin polymers such as polyisobutylene, the preferred ratio is one molecular proportion of the sulfide of phosphorus to two to five molecular proportions of polymer. In such case the reaction is continued until all or substantially all of the phosphorus sulfide has reacted. The reaction time is not critical, and the time required to cause the maximum amount of phosphorus sulfide to react will vary greatly with the temperature. A reaction time of 2 to 10 hours is frequently necessary. If desired, the reaction product may be further treated by blowing with steam, alcohol, ammonia, or an amine at an elevated temperature of about 200° F. to about 600° F. to improve the odor thereof.

The neutralized phosphorus sulfide-hydrocarbon reaction product may then be prepared by reacting the above phosphorus sulfide-hydrocarbon reaction product with the organic basic compound, such as guanidine or guanidine derivative of the type described above. This reaction may be carried out, preferably in a non-oxidizing atmosphere, by contacting the phosphorus sulfide-hydrocarbon reaction product, either as such or dissolved in a suitable solvent such as naphtha, with the basic compound, preferably at a temperature of about 100° F. to 400° F. It is desirable to employ at least enough of the basic compound to neutralize the phosphorus sulfide-hydrocarbon product. In practice a somewhat greater amount of basic compound is generally employed, since the basic compound can be reacted in proportions greater than that required for the neutralization.

It has also been found that the multi-valent metallic soaps, particularly those of the higher fatty acids, are effective as dispersing aids for carbon black in synthetic, rubbery polymers. For instance, barium oleate is an effective dispersing agent for carbon black in isobutylene-diolefin copolymers.

EXAMPLE 1

Tests carried out in the laboratory using the guanidine salt of $P_2S_5$-treated polyisobutylene serve to illustrate the invention. Two different compound samples were mixed. One contained 100 parts of a rubbery copolymer made of about 97% isobutylene and 3% isoprene, and 30 parts of channel carbon black while the other contained, in addition to the same amounts of copolymer and black, 3 parts of the guanidine salt of $P_2S_5$-treated polyisobutylene (mol. wt. 1200). Mixing was done on a conventional laboratory rubber mill. The mixed compounds were then dissolved in a heptane solvent at a concentration of 10 per cent solids.

The solutions so prepared were used to evaluate the effectiveness of the guanidine salt as a dispersing agent. It was found that the behavior of the two samples was quite different. When diluted to about 0.05 per cent solids, the solution containing no guanidine salt appeared cloudy when viewed against a light. Furthermore, by shaking the dilute solution gently, it was possible to observe the movement of carbon black particles with the eye. Sedimentation of the solid particles was rapid and appeared complete in 2 or 3 hours.

In contrast to the above described behavior, the dilute solutions of the compound containing 3 parts of the guanidine salt were clear in appearance and contained no solid particles large enough to be detected by the unaided eye. Even after several days standing no apparent settling of the solid particles took place. This was good evidence that the subdivision or dispersion of the pigment was much improved over that of the control containing no dispersing aid and that it was close to colloidal in nature.

In another test, the solid particles were examined in detail with the aid of a microscope at both 1,000× and 2,500× magnifications. It was observed that the particles in the control solution were large and non-uniform, and that the particles in the guanidine salt solution were small and uniform. The difference was very great and clearly demonstrated the superior dispersion obtained when the guanidine salt was added to the dry polymer mixture.

EXAMPLE 2

Obviously, coarse heavy solid carbon black particles settle more rapidly in a liquid medium than do more finely divided particles. This principle was employed in a quantitative measuring of the degree of dispersion obtained when carbon black was added to rubber or rubberlike materials with and without the dispersing aids. Mill mixtures of polymer and carbon black were first dissolved in a suitable solvent. Portions of the solutions were then centrifuged under predetermined and constant conditions of speed and time as a means of accelerating the rate of sedimentation of the pigment. Weight comparisons were made of the amount of precipitated black. An illustrative experiment is described below showing the results obtained by using the guanidine salt of $P_2S_5$-treated polyisobutylene (1200 mol. wt.). The compounding recipes for the two comparative samples are as follows:

| Component | Parts by weight | |
|---|---|---|
| | Sample 1 | Sample 2 |
| Butadiene-styrene copolymer (GR-S) | 100 | 100 |
| Zinc Oxide | 5 | 5 |
| Stearic Acid | 1 | 1 |
| Sulfur | 2.5 | 2.5 |
| Benzothiazyldisulfide | 1.5 | 1.5 |
| Carbon Black | 30 | 30 |
| Neutral Hydrocarbon Solvent [1] | 1.5 | |
| Guanidine Salt of $P_2S_5$-Polyisobutylene (50% active ingredient) | | 3 |

[1] This solvent was added to compensate for the inherent softening action of the hydrocarbon portion of the dispersing agent.

Solutions were made from these two compounds by dissolving the dry stock in heptane at a concentration of 10% solids. Exactly 100 ml. of each solution was centrifuged for ½ hour at 1500 R. P. M. The supernatant liquid containing unsettled pigment was carefully poured off and 90 additional ml. of solution added. Centrifuging was repeated as before and the supernatant liquid again removed. Finally, the precipitated pigment was washed from the centrifuge tube into a tared evaporating dish. After drying on a steam bath, the weight of carbon black was determined with the following results:

|  | Weight of black (gms.) |
|---|---|
| Sample 1 (control) | 0.4750 |
|  | 0.4845 |
|  | 0.4756 |
| Average | 0.4784 |
| Sample 2 (dispersing aid) | 0.2945 |
|  | 0.2955 |
|  | 0.2644 |
| Average | 0.2848 |

It is seen that the carbon black particles or agglomerates in Sample 1 settled much more rapidly than did those in Sample 2 which contained the guanidine salt. This shows that the pigment particles were more efficiently dispersed on the mill when the dispersant was present.

EXAMPLE 3

A light microscope was used to obtain an accurate picture of pigment distribution in the rubber. The work described below was carried out with a copolymer prepared by low temperature polymerization of a mixture of 97.5% isobutylene and about 2.5–3% of isoprene, and with the guanidine salt of $P_2S_5$-treated polyisobutylene as the dispersing aid.

Five sample compounds were mixed having the same basic ingredients.

Components:     Parts by weight
    Polymer _____ 100
    Zinc oxide _____ 5
    Sulfur _____ 2
    Tetramethylthiuramdisulfide _____ 1
    Mercaptobenzothiazole _____ 0.5
    Carbon black _____ 30

| Sample No. | 3 | 4 | 5 | 6 | 7 |
|---|---|---|---|---|---|
| Guanidine Salt of $P_2S_5$-polyisobutylene (50%) | 10 | 6 | 3 | | |
| White Oil (plasticizer) [1] | | | | 5 | |
| Stearic Acid [1] | | | | | 3 |

[1] These materials were added to compensate for the inherent softening action of the hydrocarbon portion of the dispersing agent.

Each of the five sample stocks was dissolved in heptane at 10% solids concentration. The 10% solutions were diluted to 5% with heptane. These 5% solutions were used to cast thin films on microscopic slides. These films were examined under the microscope at a range of magnifications from 970× to 2500×.

It is immediately apparent that much better dispersion has been obtained in the mixtures (samples 3, 4 and 5) containing the guanidine salt. Both control compounds are badly agglomerated. It is evident that stearic acid is not effective as a dispersiong aid for pigments in rubbers.

EXAMPLE 4

The most important practical factor in determining the value gained through better dispersion is the effect upon properties of the final vulcanizates. It might be expected that improved dispersion of pigments would produce vulcanizates superior in overall quality as well as in uniformity. Data obtained in carefully controlled tests demonstrate that such is the case.

*a. Breaking stress.*—One type of test employed was a special breaking stress determination. In the ordinary type of tensile tests, vulcanizate specimens are elongated at some constant and usually rapid rate until failure occurs. Such tests do not allow time for sample flaws to develop. The result is that the actual effect of these vulcanizate imperfections on tensile values is minimized. Such tests fail to establish any relationship between breaking stress and time of stress application. By the technique employed here the breaking stress was determined as a function of time. Small vulcanizate dumbbells were loaded directly with a range of dead weights and time to break was recorded. Data obtained on the five sample stock compounds described previously in Example 3 serve to illustrate the type of results obtained. All samples were vulcanized for 120 minutes at 300° F.

| Sample No. | 3 | 4 | 5 | 6 | 7 |
|---|---|---|---|---|---|
| Guanidine Salt of $P_2S_5$-polyisobutylene (50%) | 10 | 6 | 3 | | |
| White Oil (plasticizer)[1] | | | | 5 | |
| Stearic Acid [1] | | | | | 3 |

[1] These materials were added to compensate for the inherent softening action of the hydrocarbon portion of the dispersing agent.

*Table I*

| Time range (Secs.) | Breaking stress, lbs./sq. in. | | | | |
|---|---|---|---|---|---|
| | Sample 3 | Sample 4 | Sample 5 | Sample 6 | Sample 7 |
| 1 | 1,500–1,600 | 1,250–1,500 | 1,000–1,250 | | 1,450 |
| 2–10 | 1,400–1,500 | 1,100–1,300 | | 1,200–1,500 | 950–1,150 |
| 10–50 | 1,300–1,350 | 900 | 900 | | 850– 950 |
| 50–200 | 1,200–1,400 | 750– 900 | 1,175 | | 850– 900 |
| >200 | 1,300–1,400 | 975–1,100 | 700 | 700–1,000 | 800– 900 |

The most important effect shown in these data is the higher breaking stress values given by sample 3 compound and to a lesser extent stocks 4 and 5 during extended periods of load application. Under extended strain the compounds containing no dispersing aid (guanidine salt of $P_2S_5$-polyisobutylene) deteriorate more rapidly. In practical applications this means that in any particular time range of application of stress, compound sample 3 (and to a lesser extent compounds samples 4 and 5) will survive rupture at stresses which will cause failure in compounds samples 6 and 7. The superior performance of the compounds containing the guanidine salt (samples 3, 4 and 5) is the result of better dispersion of the carbon black in the polymer. This improvement gives a more homogeneous and more nearly flaw-free vulcanizate in which the active carbon black surface area available for reinforcement is greatly increased.

*b. Tear strength.*—It is known that tear strength of rubber vulcanizates also improves with improved dispersion of pigments. In order to study this property, preliminary tear tests on the five sample compounds (3–7) used for microphotographs and breaking stress were carried out. The results are contained in Table II.

*Table II*

| Sample | Tear Strength Kg./cm./0.1 cm.* | Extension @ Break** |
|---|---|---|
| 3 | 1.62 | 180 |
| | 1.45 | 240 |
| | 1.48 | 220 |
| | 1.49 | 180 |
| 4 | 1.58 | 140 |
| | 1.55 | 160 |
| | 1.52 | 140 |
| 5 | 1.42 | 140 |
| | 1.49 | 100 |
| | 1.51 | 180 |
| 6 | 1.50 | 160 |
| | 1.50 | 120 |
| 7 | 1.65 | 160 |
| | 1.54 | 120 |

\* Kg./cm./0.1 cm.—force in kilograms to tear a specimen 1 cm. thick through a distance of 0.1 cm.
\*\* Extension @ Break—percent of original length (0.5″) (1.27 cm.).

It is important to note both the tear strength and the extension of the sample at break in this table. On the basis of these data it can be concluded that the use of the dispersing aid has given more extensible vulcanizates with equivalent tear strength. In a practical sense this means that a rubber article prepared from the compound of sample 3 could be elongated or distorted to a greater extent before tearing would occur.

EXAMPLE 5

The beneficial effect of the guanidine salt of $P_2S_5$-treated bright stock was also shown in tests on rubbery materials. Isobutylene-isoprene copolymer, butadiene-styrene copolymer and natural rubber were used in the three mixtures tested and each compound contained 3 parts of active dispersing ingredient. Microphotographs of the polymer samples show the dispersion of the black was excellent in all three polymers.

What is claimed is:

1. A process for the compounding of improved rubbery compositions comprising admixing a copolymer containing a major proportion of isobutylene and a minor proportion of isoprene, carbon black, and from 0.2 to 10 parts by weight of the guanidine salt of a $P_2S_5$-treated polyisobutylene having a Staudinger molecular weight of about 1200 the $P_2S_5$ treatment being carried out at a temperature above 200° F.

2. An improved rubbery composition consisting essentially of an elastomer having a major proportion of isobutylene and a minor proportion of isoprene, carbon black, and from 0.2 to 10 parts by weight of the guanidine salt of a $P_2S_5$-treated polyisobutylene, having a Straudinger molecular weight of about 1200 the $P_2S_5$ treatment being carried out at a temperature above 200° F.

3. A process for the compounding of improved rubbery compositions which comprises admixing a rubbery hydrocarbon elastomer, carbon black, and a material made by first reacting $P_2S_5$ with a material selected from the group consisting of hydrocarbon oils, waxes and polymers, at a temperature above about 200° F., and then making salts thereof by reaction with a compound having the general formula:

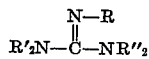

in which R, R' and R'' are selected from the group consisting of hydrogen and hydrocarbon groups containing 1 to 20 carbon atoms.

4. A process for the compounding of improved rubbery compositions comprising admixing a copolymer containing a major proportion of isobutylene and a minor proportion of isoprene, carbon black, and a material made by reacting $P_2S_5$ with a material selected from the group consisting of hydrocarbon oils, hydrocarbon waxes and hydrocarbon polymers, at a temperature above about 200° F., and then making salts thereof by reaction with a compound having the general formula:

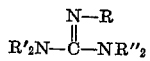

in which R, R', and R'' are selected from the group consisting of hydrogen and hydrocarbon groups containing 1 to 20 carbon atoms.

5. An improved rubbery composition consisting essentially of a rubbery hydrocarbon elastomer, carbon black, and a material made by reacting $P_2S_5$ with a material selected from the group consisting of hydrocarbon oils, hydrocarbon waxes and hydrocarbon polymers, at a temperature above about 200° F., and then making salts thereof by reaction with a compound having the general formula:

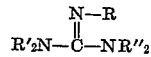

in which R, R' and R'' are selected from the group consisting of hydrogen and hydrocarbon groups containing 1 to 20 carbon atoms.

6. A process for the compounding of improved rubbery compositions which comprises admixing a rubbery, synthetic butadiene-styrene copolymer, carbon black, and a material made by first reacting $P_2S_5$ with a material selected from the group consisting of hydrocarbon oils, waxes and polymers, at a temperature above about 200° F., and then making a guanidine salt thereof.

7. A process for the compounding of improved rubbery compositions which comprises admixing a rubbery, synthetic isobutylene-isoprene copolymer, carbon black, and a material made by first reacting $P_2S_5$ with a material selected from the group consisting of hydrocarbon oils, waxes and polymers, at a temperature above about 200° F., and then making a guanidine salt thereof.

References Cited in the file of this patent

UNITED STATES PATENTS

| Number | Name | Date |
|---|---|---|
| 2,375,315 | Mixon | May 8, 1945 |

OTHER REFERENCES

Abstract of application Serial No. 556,493 filed by Amon, Sept. 29, 1944, published Nov. 7, 1950, 640 O. G. 343.